(12) United States Patent
Bartel et al.

(10) Patent No.: US 7,353,613 B2
(45) Date of Patent: Apr. 8, 2008

(54) DIRECTIONAL SENSOR SYSTEM COMPRISING A SINGLE AXIS SENSOR ELEMENT POSITIONED AT MULTIPLE CONTROLLED ORIENTATIONS

(75) Inventors: Roger P. Bartel, Spring, TX (US);
Jian-Qun Wu, Kingwood, TX (US)

(73) Assignee: Weatherford Canada Patnership, Edmonton, Alberta (CA)

( * ) Notice: Subject to any disclaimer, the term of this patent is extended or adjusted under 35 U.S.C. 154(b) by 43 days.

(21) Appl. No.: 11/427,435

(22) Filed: Jun. 29, 2006

(65) Prior Publication Data
US 2007/0011895 A1    Jan. 18, 2007

Related U.S. Application Data

(60) Provisional application No. 60/695,748, filed on Jun. 30, 2005.

(51) Int. Cl.
*E21B 47/022* (2006.01)
(52) U.S. Cl. .......................... 33/304; 175/45
(58) Field of Classification Search .............. 33/302, 33/303, 304, 312, 313, 355 R; 175/45
See application file for complete search history.

(56) References Cited

U.S. PATENT DOCUMENTS

| | | | | |
|---|---|---|---|---|
| 4,021,774 A | * | 5/1977 | Asmundsson et al. | 33/313 |
| 4,594,790 A | * | 6/1986 | Engebretson | 33/304 |
| 4,894,923 A | * | 1/1990 | Cobern et al. | 33/304 |
| 5,519,668 A | * | 5/1996 | Montaron | 175/45 |
| 5,806,195 A | * | 9/1998 | Uttecht et al. | 33/304 |
| 6,453,239 B1 | * | 9/2002 | Shirasaka et al. | 33/304 |
| 2003/0056381 A1 | * | 3/2003 | Brosnahan et al. | 33/313 |
| 2007/0006472 A1 | * | 1/2007 | Bauch | 33/355 R |
| 2007/0029111 A1 | * | 2/2007 | Chen | 175/24 |

* cited by examiner

*Primary Examiner*—G. Bradley Bennett
(74) *Attorney, Agent, or Firm*—Wong, Cabello, Lutsch, Rutherford & Brucculeri, LLP

(57) ABSTRACT

A directional sensor system that incorporates a single axis sensor element that is manipulated to a plurality of orientations. The resulting responses of the sensor element at these locations are combined to obtain a measure of orientation of the system. The system applicable for determining orientation of instrumentation within a well borehole such as measurement-while-drilling, wireline and tubing conveyed borehole instrumentation. The system can be used in other subsurface and surface applications.

18 Claims, 2 Drawing Sheets

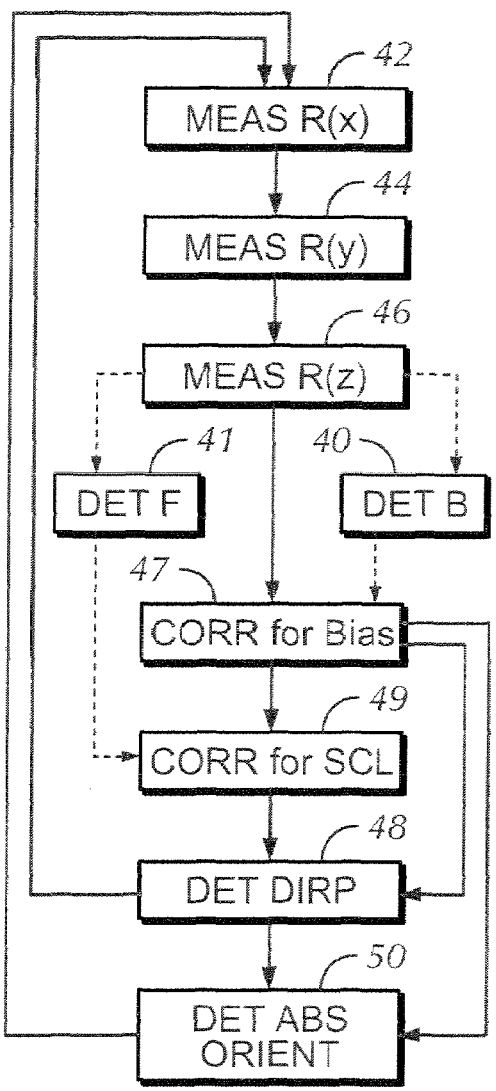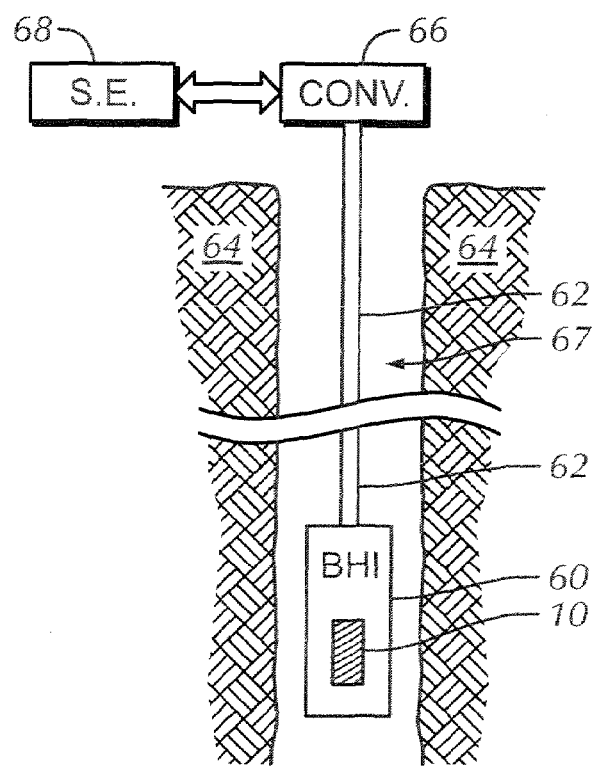
*FIG. 3*
*FIG. 4*

DIRECTIONAL SENSOR SYSTEM COMPRISING A SINGLE AXIS SENSOR ELEMENT POSITIONED AT MULTIPLE CONTROLLED ORIENTATIONS

This application is related to co-pending Application No. 60/695,748 entitled "DIRECTIONAL SENSOR SYSTEM COMPRISING A SINGLE AXIS SENSOR ELEMENT POSITIONED AT MULTIPLE CONTROLLED ORIENTATIONS" which was filed on Jun. 30, 2005. The benefit of priority under 35 U.S/C. § 119(e) is hereby claimed. The contents of Application No. 60/695,748 are hereby incorporated by reference.

This disclosure is directed toward a directional sensor system. More particularly, the disclosure is directed toward a system comprising a single axis sensor element which is manipulated to a plurality of orientations, and the resulting responses of the sensor element at these locations are combined to obtain a measure of orientation of the system. The system applicable for determining orientation of instrumentation within a well borehole, but can be used in other subsurface and surface applications.

BACKGROUND OF THE INVENTION

Many subsurface operations require a directional sensor system to measure borehole orientation or orientation of an instrument within the borehole. A directional sensor system typically comprises at least two sets of three directional sensor elements configured so that the axes of the sensor elements are orthogonal. Responses of the directional sensor elements are combined to obtain a measure of orientation of the directional sensor system in three dimensional space.

Several types of directional sensor elements are used in directional sensor systems. These types of sensor elements include magnetometers, accelerometers, and gyroscopes. The response of a directional sensor element typically includes bias, scale factor and mechanical misalignment components. Bias, scale factors and mechanical misalignment components are typically different for each of the at least three directional sensor elements. When responses of the sensor elements are combined, bias. scale factor and mechanical misalignment can be a source of error in the orientation determination. Borehole directional sensor systems are typically calibrated at the surface of the earth. Calibration includes determinations of bias and scale factor for each directional sensor element. These determinations are subsequently used to correct the individual sensor responses prior to combining to determine orientation.

Bias and scale factor of the sensor elements can change as a function of time in typically harsh borehole environment. Temperature also has a strong influence on bias and scale, especially at the higher operating temperatures of 185 to 200 degrees centigrade (° C.). It is not unusual to see hysteresis effects in sensors for which the calibration will vary when traversing the same temperature point from different directions. Furthermore, the magnitude of bias and scale factor change can be different for multiple directional sensor elements. These changes in bias and scale factor, which occur after system calibration at the surface of the earth, can result in erroneous borehole orientation determinations.

BRIEF DESCRIPTION OF THE DRAWINGS

FIG. 3 is a flow chart illustrating the determination of system orientation from responses of the directional sensor element oriented in the three positions, and further illustrates periodic downhole determination of bias or scale factor or both bias and scale factor; and FIG. 4 is a conceptual illustration of the directional sensor system embodied in borehole instrumentation.

DESCRIPTION OF THE INVENTION

Figure 1:
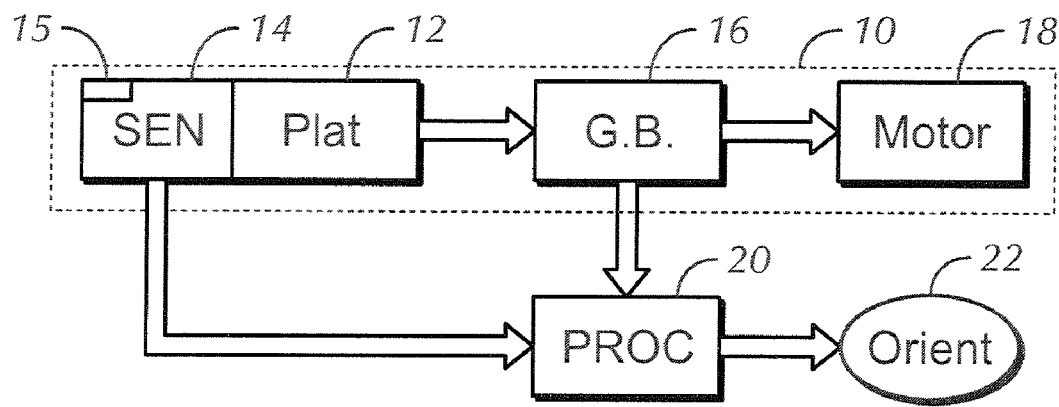
FIG. 1 is a functional illustration of the major components of the directional sensor system.

FIG. 1 is a conceptual illustration of the major components of the directional sensor system. The directional sensor assembly 10 comprises a sensor 14 disposed on a positioning device. The positioning device comprises a platform 12 that is operated by preferably a stepper motor 18 through a gear box 16. The sensor 14 comprises one or more directional sensor elements 15. The motor 18 and cooperating gear box 16 manipulate the platform 12 so that the sensor 14 is positioned in at least three preferably orthogonal and repeatable positions. Responses of the sensor 14, and corresponding positions of the sensor which are preferably obtained using one or more signals from the moving elements (such as the gear box 16 shown in FIG. 1), are input to a processor 20. This information is combined to determine a measure of orientation of the directional sensor assembly 10, which is illustrated conceptually as output 22. Components shown in FIG. 1 will be discussed in more detail in the following paragraphs.

The sensor 14 can comprise a single directional sensor element, or a plurality of directional sensor elements. The one or more directional sensor elements can be magnetometers, accelerometers, fluxgates, gyros, or combinations of these types. For purposes of subsequent discussion, it will be assumed that the sensor 14 comprises a single directional sensor element. Such sensors can be responsive to measurement fields such as gravity, electric field, magnetic field, and rotation.

In this disclosure, a single direction sensor element is defined as a direction sensor element that has its main response to a specific directional stimulus in a single axis. Some "single direction sensor elements" have multiple integrated axes. There is, therefore, a difference between a plurality of directional sensor elements which are simply replicates positioned preferably orthogonal, and a plurality of direction sensor elements that are a grouping of single axis directional sensor elements which are responsive to different directional stimuli and/or use different technologies to do the sensing. It is also noted that a mix of single and multiple axis sensors can be used to determine orientation.

The sensor 14 is disposed on a platform 12. A suitable platform is disclosed in U.S. Pat. No. 4,021,774 (Teleco Systems), and is entered herein by reference. Other types of platforms, which can be manipulated to at least three preferably orthogonal positions, can be used.

The platform 12 is controlled by a cooperating motor 18 operating through a gear box 16. The motor is preferably a stepper motor type. A suitable gear box 16 is manufactured and offered commercially by Harmonic Drive Systems Inc, Tokyo, Japan. This motor-gear box combination is accurate to about one arc minute, with a resolution of about 1 arc second.

Outputs from the sensor 14, as well as an indication of the sensor position preferably obtained as one or more signals from the gear box 16, are combined using a processor 20 thereby yielding orientation of the directional sensor assembly 10. The processor 20 is shown independent of the assembly 10. The processor 20 can be disposed downhole remote from the sensor assembly 10, or disposed at the surface of the earth receiving telemetered sensor position and response data for processing. Alternately, sensor position and response data can be stored downhole for subsequent retrieval and processing. The processor 20 can be included (not shown) in the directional sensor assembly 10. In this embodiment, sensor position and response data are combined in the downhole processor, and resulting orientation output 22 can be either telemetered to the surface of the earth or stored downhole for subsequent retrieval.

Figure 2A:
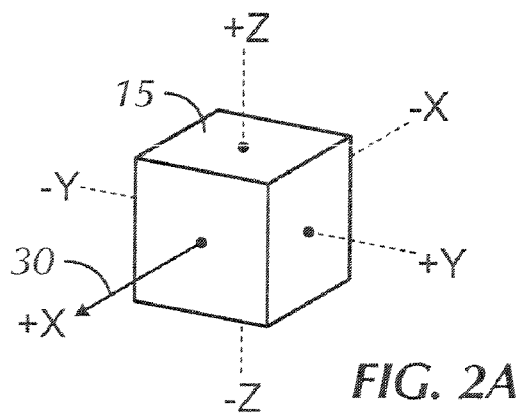
FIG. 2a illustrates a single directional sensor element oriented in a first position.
Figure 2B:
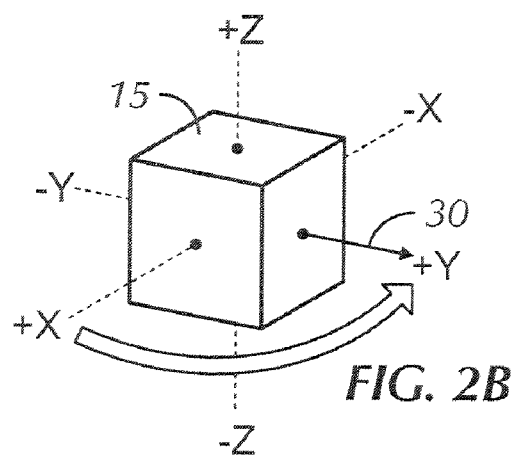
FIG. 2b illustrates the single directional sensor element oriented in a second position.
Figure 2C:
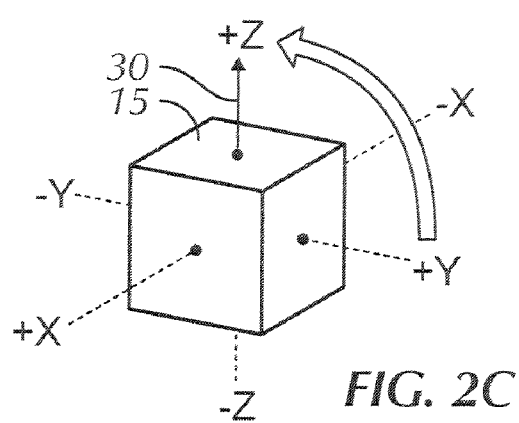
FIG. 2c illustrates the single directional sensor element oriented in a third position.

FIGS. 2a-c illustrate how a single axis directional sensor element 15 of the sensor 14 is manipulated by the cooperating platform gate 12, gearbox 16 and motor 18 to three preferably orthogonal positions. FIG. 2a shows the sensor element 15 oriented with a sensitivity axis 30 in the +x direction. The sensor element 15 is then manipulated to a second position with the sensitivity axis 30 is in the +y direction. This position is illustrated in FIG. 2b. FIG. 2c shows the sensor element manipulated to a third position with the sensitivity axis in the +z direction. Sensor responses are measured at each position, and combined to obtain a measure of orientation of the directional sensor assembly 10. FIGS. 2a-c illustrate the preferred three orthogonal and repeatable sensor positions. It should be understood that the sequencing of the sensor manipulation can be varied, more than three sensor positions can be used, and orthogonality is not required to obtain a measure of orientation of directional sensor assembly 10. It is emphasized, once again, that all measurements can obtained with a single axis directional sensor element 15, which allows the directional sensor system to be periodically calibrated within a well borehole. These calibrations yield parameters that are used to correct measurements error related to the effects of bias, scale factor and mechanical misalignment.

Bias Determination

The response of a sensor element containing a bias can be expressed as $$R(\theta) = S(\theta) + B \quad (1)$$

where
$R(\theta)$=the observed response of a sensor element oriented in a plane at an angle $\theta$ with respect to a reference point;
$S(\theta)$=the "signal" component of the response; and
$B$=the bias of the sensor element.

If the sensor element rotates 180 degrees in the plane, the sensor response is $$R(\theta+180) = S(\theta+180) + B. \quad (2)$$

But $$S(\theta) = -S(\theta+180). \quad (3)$$

Then the equations (1) through (3) are combined to yield an expressions for bias B and $S(\theta)$, which are $$B = [R(\theta) + R(\theta+180)]/2 \text{ and}$$

$$S(\theta) = [R(\theta) - R(\theta+180)]/2 \quad (4)$$

where $R(\theta)$ and $R(\theta+180)$ are measured quantities. It should be noted that bias can be determined with the directional assembly within a borehole. No surface calibration stand is required. It should also be noted that the bias B is an algebraic additive term with respect to the signal component $S(\theta)$. It should be understood, therefore, that the above is only an example of a technique for determining B, and that other methods can be used with equal effectiveness.

Scale Factor Determination

The response of a sensor element containing a scale factor can be expressed as $$R(x) = FS(x), \quad (5)$$

where
$R(x)$=is again the observed response of a sensor element oriented along x axis of the sensor frame;
$S(x)$=is again the "signal" component of the response; and
$F$=the scale factor of the sensor element.

If the sensor element is rotated to sensor y and z axes, the sensor responses are $$R(y) = FS(y) \quad (6)$$

$$R(z) = FS(z) \quad (7)$$

The scale factor is determined by $$F = \frac{R_{ref}}{\sqrt{R(x)^2 + R(y)^2 + R(z)^2}} \quad (8)$$

where $R_{ref}$ is the reference value of the field from a source independent of the sensor measurement. In the above example, the x, y, and z axes are assumed to be perfectly orthogonal for simplicity of presentation.

It should be noted that, like bias, scale factor can be determined with the directional assembly within a borehole. Again, no surface calibration stand is required. It should also be noted that the scale factor F is a multiplicative term with respect to the signal component S. If only the direction of the sensor assembly 10 is being determined from the at least three preferably orthogonal readings of the directional sensor element, it is not necessary to determine scale factor since ratios of responses are used. If, however, it is of interest to determine F, it is noted that the above is only an example of a technique, and that other methods can be used with equal effectiveness. It is also noted that scale factor F is relatively slowly varying. If it is of interest to determine F, such determinations typically can be made downhole less frequently than bias determinations, without significant sacrifice in accuracy.

FIG. 3 is a functional flow chart of one method for determining the orientation of the directional sensor assembly 10. Responses $R(\theta)$ of the sensor 14 are determined at at least three positions at steps 42, 44 and 46. For purposes of illustration, it is assumed that response measurements are made at three orthogonal positions as illustrated in FIGS. 2a-2c (i.e. R(x), R(y), and R(z)). Bias B for the sensor is determined at step 40 using, as an example, the methodology discussed above. Since bias B can be typically determined at predetermined intervals, a broken line is used to connect step 40. Sensor responses are corrected for bias at step 47. As illustrated conceptually by broken lines connecting steps 40 and 47, a single measure of bias B can be used to correct a plurality of measured values of sensor responses R(x), R(y), and R(z). Values of R(x), R(y), and R(z), corrected for bias B, are combined to determine directional sensor assembly orientation at step 48. As stated previously, one option is to repeat steps 42, 44 and 46 without a new determination of bias B. Scale factor is determined at step 41 using, as an example, the methodology discussed above. As with bias, a scale factor S can be determined at predetermined intervals and used to correct a plurality of sensor reading sets R(x), R(y), and R(z) at step 49. Directional measurements as discussed above are made with respect to the directional sensor system. These directional measurements can be referenced to an absolute direction or orientation at step 50 using any appropriate absolute orientation methodology known in the art. The scale factor correction step can be omitted, as shown in the flow chart, if only a measure of direction is required. It should be understood that the functional flow chart of FIG. 3 shows only some of the options for data processing.

FIG. 4 is a conceptual illustration of the directional sensor assembly 10 embodied in a well borehole system. A borehole instrument 60 is shown disposed within a borehole 67 which penetrates earth formation 64. A first end of a data conduit 62 is operationally connected to the directional sensor assembly 10 within the borehole instrument 60. A second end of the data conduit 62 is operationally connected to a conveyance apparatus 66 positioned at the surface of the earth. Surface equipment 68 cooperates with the borehole instrument 60 through the conveyance apparatus 66 and data conduit 62. The borehole instrument 60 is conveyed along the borehole 67 by conveyance apparatus cooperating with the data conduit 62. Orientation of the directional sensor assembly 10, thus orientation of the borehole instrument 60 in which it is disposed, is determined at periodic intervals as summarized in functional diagram of FIG. 3.

If the directional sensor assembly 10 is embodied in a measurement-while-drilling (MWD) or a logging-while-drilling (LWD) system, the borehole instrument 60 is typically a drill collar, the data conduit 62 is a drill string, and the conveyance apparatus 66 is a drilling rig. If the directional sensor assembly 10 is embodied in a tubing conveyed logging system, the borehole instrument 60 is typically a logging instrument, the data conduit 62 is coiled tubing, and the conveyance apparatus 66 is a coiled tubing injector. If the directional sensor assembly 10 is embodied in a wireline conveyed logging system, the borehole instrument 60 is typically a logging instrument, the data conduit 62 is a wireline, and the conveyance apparatus 66 is a draw works comprising a winch and associated power.

The invention claimed is:

1. A directional sensor system comprising:
   (a) a directional sensor assembly comprising
      (i) a single directional sensor element, and
      (ii) a positioning device for positioning said directional sensor element at multiple sensor orientations; and
   (b) a processor cooperating with said directional sensor element to combine responses of said directional sensor element at said multiple sensor orientations to obtain at least one parameter of a measurement field.

2. The system of claim 1 wherein said measurement field is selected from a group comprising gravity, electric field, magnetic field, and rotation.

3. A directional sensor system comprising:
   (a) a directional sensor assembly comprising
      (i) a single directional sensor element, and
      (ii) a positioning device for positioning said directional sensor element at multiple sensor orientations; and
   (b) a processor cooperating with said directional sensor element to combine responses of said directional sensor element at said multiple sensor orientations to obtain at least one parameter of the orientation of said directional sensor assembly.

4. The system of claim 2 wherein said multiple sensor orientations are orthogonal.

5. The system of claim 2 wherein said positioning device comprises moving elements comprising:
   (a) a platform upon which said directional sensor element is disposed;
   (b) a gear box cooperating with said platform; and
   (c) a motor cooperating with said gear box to position said platform to obtain said multiple sensor orientations.

6. The system of claim 5 wherein:
   (a) each said sensor orientation is defined by a signal generated by at least one of said moving elements; and
   (b) each said signal generated by said at least one of said moving elements and each corresponding said response of said directional sensor element in that orientation are input to said processor and combined therein to obtain said at least one parameter of the orientation of said sensor assembly.

7. The system of claim 3 further comprising:
   (a) a data conduit cooperating with said directional sensor assembly; and
   (b) a conveyance apparatus cooperating with said data conduit to convey said directional sensor assembly within a borehole.

8. The system of claim 7 further comprising a borehole instrument in which said directional sensor assembly is disposed; and
   (a) said data conduit comprises a drill string cooperating with said borehole instrument;
   (b) said conveyance apparatus comprises a drilling rig; and
   (c) said borehole instrument is conveyed within said borehole by said drill string cooperating with said drilling.

9. The system of claim 3 wherein said at least one parameter is from a group comprising bias and scale factor.

10. A method for determining at least one parameter of a measurement field, the method comprising:
    (a) disposing a single directional sensor element within a sensor package;
    (b) positioning said directional sensor at multiple sensor orientations; and
    (c) combining responses of said directional sensor element at said multiple sensor orientations to obtain at least one parameter of said measurement field.

11. The method of claim 10 comprising the additional step of selecting said measurement field from a group comprising gravity, electric field, magnetic field, and rotation.

12. A method for determining orientation of a sensor package, the method comprising:
    (a) disposing a single directional sensor element within said sensor package;
    (b) positioning said directional sensor at multiple sensor orientations; and
    (c) combining responses of said directional sensor element at said multiple sensor orientations to obtain at least one parameter of the orientation of said directional sensor assembly.

13. The method of claim 12 wherein said multiple sensor orientations are orthogonal.

14. The method of claim 12 further comprising:
    (a) disposing said directional sensor element on a platform; and (b) positioning said platform with moving elements comprising a gear box and cooperating motor to obtain said multiple sensor orientations.

15. The method of claim 14 further comprising:
(a) defining each said sensor orientation using at least one signal generated by at least one of said moving elements; and
(b) combining each said at least one signal generated by at least one of said moving elements and each corresponding said response of said directional sensor element in that orientation to obtain said at least one parameter of said sensor assembly orientation.

16. The method of claim 12 further comprising operating said directional sensor assembly within a borehole.

17. The method of claim 16 further comprising:
(a) disposing said directional sensor assembly within a borehole instrument; and
(b) conveying said borehole instrument within said borehole with a drill string.

18. The system of method of claim 12 comprising the additional step of selecting said at least one parameter from a group comprising bias and scale factor.

* * * * *